US009380611B2

(12) United States Patent
Lin et al.

(10) Patent No.: US 9,380,611 B2
(45) Date of Patent: Jun. 28, 2016

(54) COMMUNICATION SYSTEM INCLUDING A FEMTOCELL AND COMMUNICATION METHOD THEREOF

(75) Inventors: Yu-Hsiang Lin, New Taipei (TW); Rong-Hong Jan, Hsinchu (TW)

(73) Assignee: Institute For Information Industry, Taipei (TW)

( * ) Notice: Subject to any disclaimer, the term of this patent is extended or adjusted under 35 U.S.C. 154(b) by 258 days.

(21) Appl. No.: 13/461,440

(22) Filed: May 1, 2012

(65) Prior Publication Data

US 2013/0244672 A1 Sep. 19, 2013

(30) Foreign Application Priority Data

Mar. 14, 2012 (TW) .............................. 101108576 A

(51) Int. Cl.
*H04W 40/00* (2009.01)
*H04W 76/02* (2009.01)
*H04W 88/16* (2009.01)
*H04W 84/04* (2009.01)

(52) U.S. Cl.
CPC ............ *H04W 76/02* (2013.01); *H04W 76/025* (2013.01); *H04W 84/045* (2013.01); *H04W 88/16* (2013.01)

(58) Field of Classification Search
CPC . H04W 84/045; H04W 84/047; H04W 76/02; H04W 76/025; H04W 84/05; H04W 84/105; H04W 88/16
USPC .......... 455/445, 448, 450, 451, 452.1, 452.2, 455/453; 370/352, 353, 354, 355, 356
See application file for complete search history.

(56) References Cited

U.S. PATENT DOCUMENTS

| 2009/0270107 A1 | 10/2009 | Lee et al. |
| 2010/0103863 A1* | 4/2010 | Ulupinar et al. ............... 370/315 |
| 2011/0194535 A1* | 8/2011 | Johansson et al. ............ 370/331 |
| 2012/0076027 A1* | 3/2012 | Akyildiz et al. ............... 370/252 |

FOREIGN PATENT DOCUMENTS

WO WO 2011/113467 A1 * 9/2011 ............ H04W 16/26

OTHER PUBLICATIONS

Office Action in corresponding Patent Application No. TW 101108576, dated May 16, 2014.

* cited by examiner

*Primary Examiner* — Thai Vu
(74) *Attorney, Agent, or Firm* — Skaar Ulbrich Macari, P.A.

(57) ABSTRACT

The communication system comprises a base station (BS), a femtocell and a core network. The femtocell deployed within the signal coverage of the BS establishes a first wired connection with an internet service provider (ISP) network and a first wireless connection with a user equipment (UE). The core network establishes a second wired connection with the ISP network and a third wired connection with the BS. The core network is configured to determine that a voice data transmission service is about to be provided to the UE, and transmit a first radio access bearer (RAB) setup request message to the BS to enable the BS to establish a second wireless connection with the femtocell according to the first RAB setup request message so that the UE performs a voice data transmission with the core network via the first wireless connection, the second wireless connection and the third wired connection.

16 Claims, 10 Drawing Sheets

COMMUNICATION SYSTEM INCLUDING A FEMTOCELL AND COMMUNICATION METHOD THEREOF

This application claims the benefit of priority based on Taiwan Patent Application No. 101108576 filed on Mar. 14, 2012, which is hereby incorporated by reference in its entirety.

CROSS-REFERENCES TO RELATED APPLICATIONS

Not applicable.

BACKGROUND

1. Field of the Invention

The present invention relates to a communication system and a communication method thereof. More particularly, the communication system of the present invention comprises a base station (BS), a femtocell and a core network. When the core network determines that a voice data transmission service is about to be provided to a user equipment (UE), the core network enables the BS to establish a wireless connection with the femtocell so as to perform a voice data transmission with the UE via the wireless connection.

2. Descriptions of the Related Art

The advancement of the communication industry has made it possible to provide users with a higher communication quality. For residential or small business environments, femtocells have been deployed as a supplement to original base stations (BSs) by the communication service provider to ease the burden of the BSs so that the overall signal coverage, the data transmission rate and the network capacity of the communication network can be improved. The femtocells are connected to a core network of the communication service provider via an Internet Service Provider (ISP) network such as a digital subscriber line (DSL) network or a cable modem network.

However, because the data transmission between the femtocells and the core network must be accomplished through the ISP network, the quality of service (QoS) of the femtocells is determined also by the network quality of the ISP network. The QoS of the femtocells and, especially, the QoS of voice data transmission tends to degrade at peak hours (i.e., time periods when the overall network traffic is relatively high) of the ISP network. Usually, the degradation of the QoS of voice data transmissions is the most obvious for the user, so once a user fails to normally make a phone call via the femtocell, the willingness of the user to use a femtocell is greatly discouraged.

Accordingly, an urgent need exists in the art to provide a solution capable of preventing the QoS of voice data transmissions provided by the femtocells from being influenced by the network quality of the ISP network.

SUMMARY

An objective of the present invention is to provide a communication system and a communication method thereof. The communication system of the present invention comprises a BS, a femtocell and a core network. The femtocell is deployed within a signal coverage of the BS. When the core network determines that a voice data transmission service is about to be provided to a user equipment (UE), the core network enables the BS to establish a wireless connection with the femtocell so as to perform a voice data transmission with the UE via the wireless connection. Thereby, when the UE performs the voice data transmission with the core network via the femtocell, the voice data transmission between the femtocell and the core network is accomplished through the BS instead of the ISP network. Thus, the influence of the network quality of the ISP network on the QoS of the voice data transmission is prevented.

To achieve the aforesaid objective, the present invention provides a communication system, which comprises a base station (BS), a femtocell and a core network. The BS has a signal coverage. The femtocell is deployed within the signal coverage, and establishes a first wired connection with an internet service provider (ISP) network and establishes a first wireless connection with a user equipment (UE). The core network establishes a second wired connection with the ISP network, and establishes a third wired connection with the BS. The core network is configured to determine that a voice data transmission service is about to be provided to the UE, and transmits a first radio access bearer (RAB) setup request message to the BS to enable the BS to establish a second wireless connection with the femtocell according to the first RAB setup request message so that the UE performs a voice data transmission with the core network via the first wireless connection, the second wireless connection and the third wired connection.

The present invention further discloses a communication method for use in a communication system. The communication system comprises a femtocell, a BS and a core network. The BS has a signal coverage. The femtocell is deployed within the signal coverage, and establishes a first wired connection with an internet service provider (ISP) network and establishes a first wireless connection with a user equipment (UE). The core network establishes a second wired connection with the ISP network and establishes a third wired connection with the BS. The communication method comprises the following steps: enabling the core network to determine that a voice data transmission service is about to be provided to the UE; and enabling the core network to transmit a first radio access bearer (RAB) setup request message to the BS to enable the BS to establish a second wireless connection with the femtocell according to the first RAB setup request message so that the UE performs a voice data transmission with the core network via the first wireless connection, the second wireless connection and the third wired connection.

The detailed technology and preferred embodiments implemented for the subject invention are described in the following paragraphs accompanying the appended drawings for people skilled in this field to well appreciate the features of the claimed invention.

DETAILED DESCRIPTION

The present invention provides a communication system and a communication method thereof. In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction.

Figure 1:
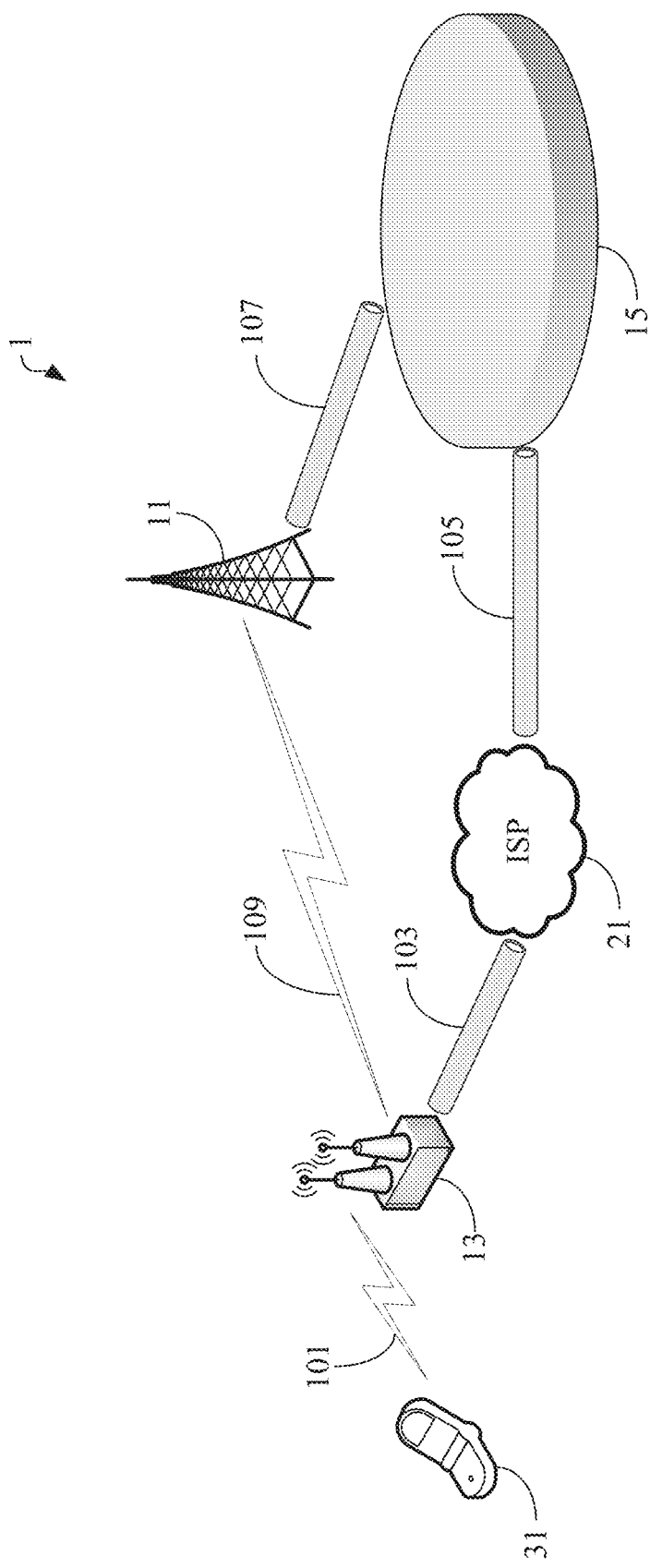
FIG. 1 is a schematic view of a communication system 1 according to the first and second embodiment of the present invention.

FIG. 1 shows a communication system 1 according to the first embodiment of the present invention. The communication system 1 comprises a base station (BS) 1, a femtocell 13 and a core network 15. In this embodiment, the communication system 1 may be a 3$^{rd}$ Generation Partnership Project (3GPP) Long Term Evolution (LTE) system, the BS 11 may be an eNB, and the femtocell 13 may be an HeNB.

The BS 11 has a signal coverage. The femtocell 13 is deployed within the signal coverage of the BS 11, and establishes a first wireless connection 101 with a user equipment (UE) and a first wired connection 103 with an Internet Service Provider (ISP) network 21. The core network 15 establishes a second wired connection 105 with the ISP network 21, and establishes a third wired connection 107 with the BS 11.

When the core network 15 determines that a voice data transmission service is about to be provided to the UE 31, the core network 15 transmits a first radio access bearer (RAB) setup request message to the BS 11 via the third wired connection 107. Upon receiving the first RAB setup request message, the BS 11 establishes a second wireless connection 109 with the femtocell 13 according to the first RAB setup request message. Thus, the UE 31 can perform a voice data transmission with the core network 15 via the first wireless connection 101, the second wireless connection 109 and the third wired connection 107 instead of via the ISP network 21. Accordingly, the voice data transmission between the UE 31 and the core network 15 will not be influenced by the ISP network 21.

Furthermore, the core network 15 can still perform a non voice data transmission with the UE 31 via the first wireless connection 101, the first wired connection 103 and the second wired connection 105. Additionally, it shall be appreciated that the femtocell 13 may have a first antenna module and a second antenna module, although the present invention is not limited thereto. In this aspect, the first antenna module is configured to establish the first wireless connection 101 with the UE 31, while the second antenna module is configured to establish the second wireless connection 109 with the BS 11.

The second embodiment of the present invention is also as shown in FIG. 1. The second embodiment differs from the first embodiment in that the core network 15 of the second embodiment further receives a Non Access Stratum (NAS) control message from the UE via the first wireless connection 101, the first wired connection 103 and the second wired connection 105. The core network 15 determines that a voice data transmission service is about to be provided to the UE 31 according to the NAS control message so as to transmit a first RAB setup request message to the BS 11.

Specifically, in the first embodiment, the establishment of the second wireless connection 109 is initiated by the core network 15; that is, the core network 15 determines that a voice data transmission service is about to be provided to the UE 31 according to its own or other users' voice data transmission needs and then transmits a first RAB setup request message to the BS 11. However, in the second embodiment, establishment of the second wireless connection 109 is initiated by the UE 31; that is, the UE 31 transmits an NAS control message to the core network 15 so that according to the NAS control message, the core network 15 determines that a voice data transmission service is about to be provided to the UE 31 and then transmits a first RAB setup request message to the BS 11.

Figure 2:
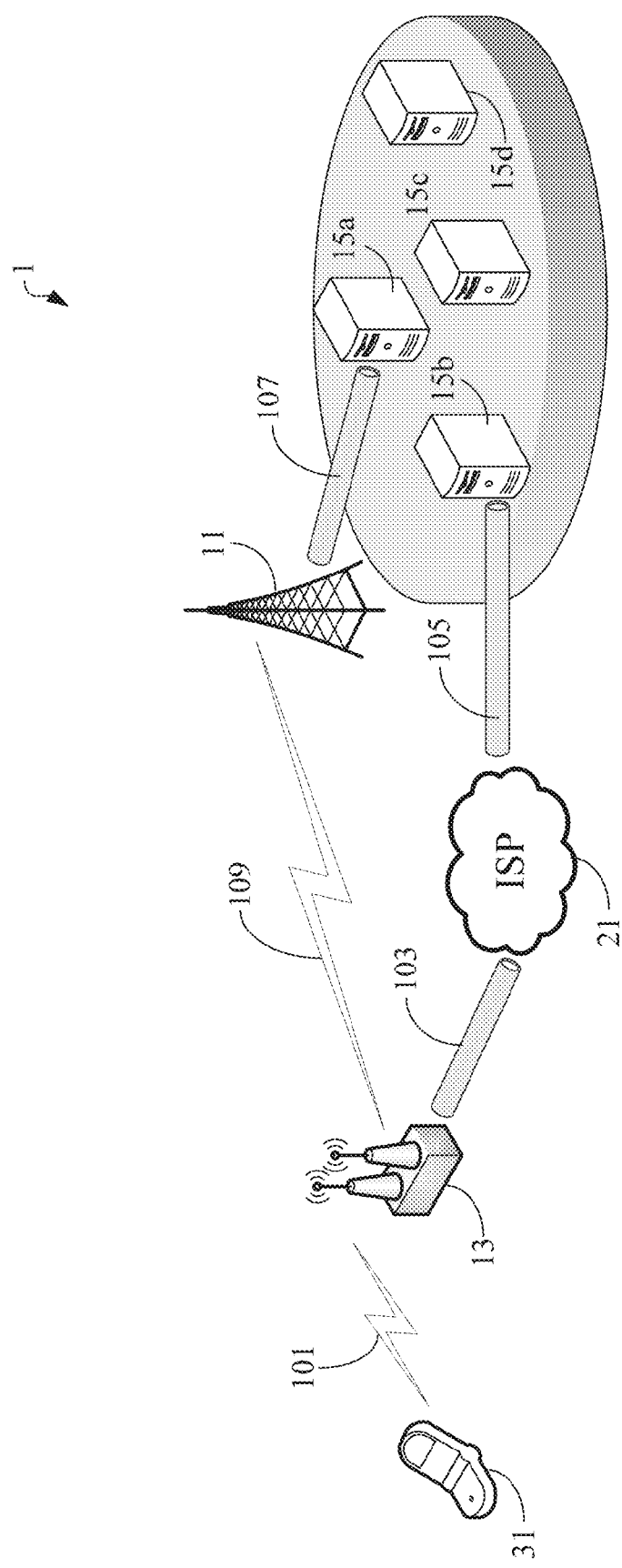
FIG. 2 is a schematic view of a communication system 1 according to the third and fourth embodiment of the present invention.

The third embodiment of the present invention is shown in FIG. 2. In the third embodiment, the core network 15 comprises a mobility management entity (MME) 15a, a femtocell gateway 15b (e.g., an HeNB gateway), a serving gateway (S-GW) 15c and a packet data gateway (P-GW) 15d. The femtocell gateway 15b establishes a second wired connection 105 with the ISP network 21, and the MME 15a establishes the third wired connection 107 with the BS 11.

Figure 3:
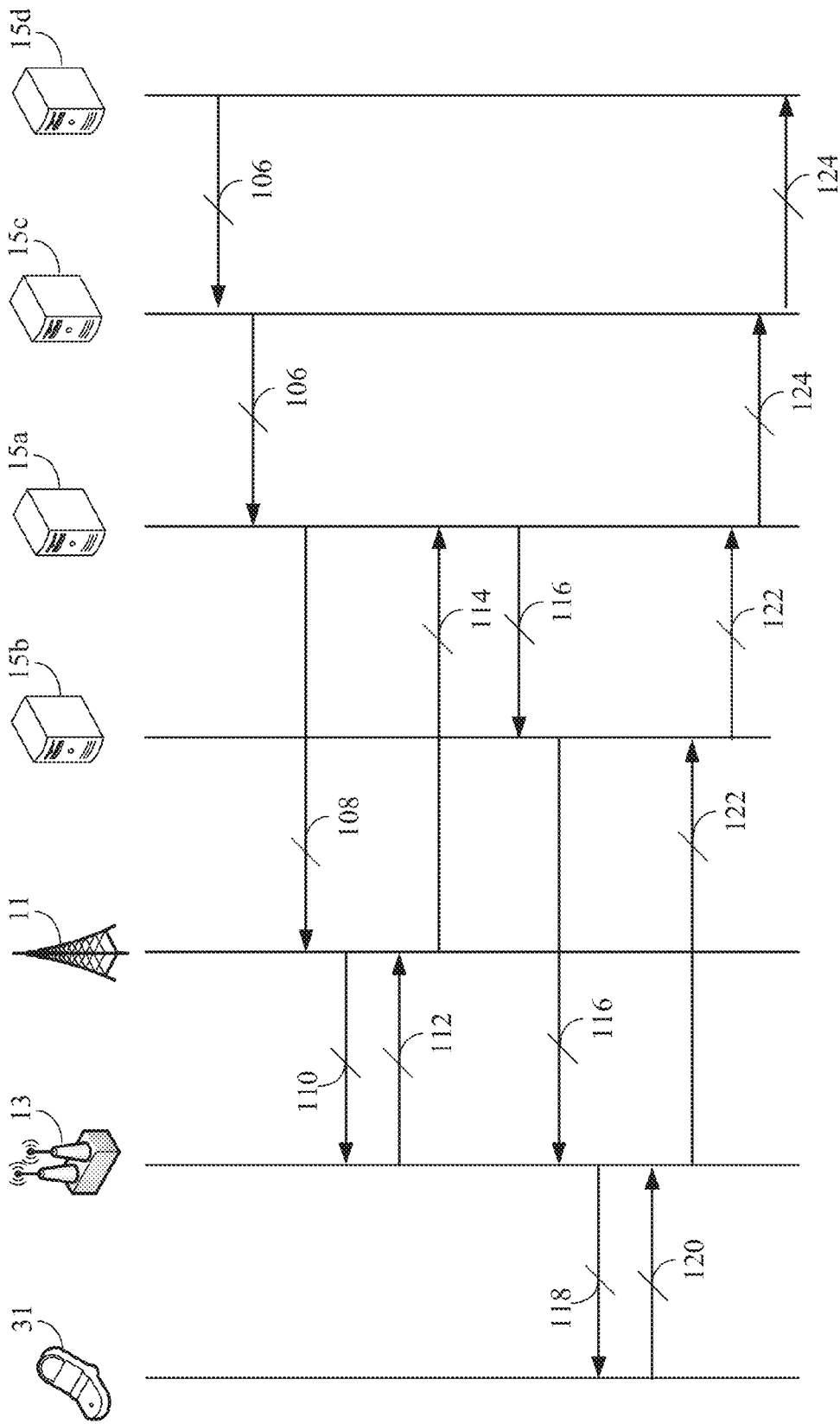
FIG. 3 is a preliminary network connection setup procedure according to the third embodiment of the present invention.

With further reference to FIG. 3, a preliminary network connection setup procedure is depicted therein. It shall be appreciated that for the purpose of simplicity, the ISP network 21 is omitted from depiction in FIG. 3. The P-GW 15d transmits a create bearer request message 106 to the S-GW 15c. The create bearer request message 106 comprises an identification and a piece of quality of service (QoS) information of the UE 31. Then, the S-GW 15c relays the create bearer request message 106 to the MME 15a. The MME 15a determines that a voice data transmission service is about to be provided to the UE 31 according to the identification and the QoS information of the UE 31 comprised in the create bearer request message 106, and then transmits a first RAB setup request message 108 over an S1-MME interface to the BS 11. The first RAB setup request message 108 comprises the identification of the femtocell 13, the NAS information (which carries the identification of the UE 31) and the QoS.

Next, the BS 11 transmits a first radio resource control (RRC) connection reconfiguration message 110 over an LTE-Uu interface to the femtocell 13. The RRC connection reconfiguration message 110 comprises the NAS information (which carries the identification of the UE 31) and the QoS information. The femtocell transmits a first RRC connection reconfiguration complete message 112 over the LTE-Uu interface to the BS 11 according to the first RRC connection reconfiguration message 110. In response to the first RRC connection reconfiguration complete message 112, the BS 11 transmits a first RAB setup response message 114 to the MME 15a to inform the MME 15a that the radio bearer has been established.

Afterwards, the MME 15a transmits a second RAB setup request message 116 to the femtocell gateway 15b according to the first RAB setup response message. The second RAB setup request message 116 comprises the identification of the UE 31, the NAS information and the QoS information. The femtocell gateway 15b relays the second RAB setup request message 116 to the femtocell 13 via the first wired connection 103 and the second wired connection 105. The femtocell 13 transmits a second RRC connection reconfiguration message 118 to the UE 31 according to the second RAB setup request message 116. The second RRC connection reconfiguration message 118 comprises the NAS information and the QoS information.

Subsequently, the UE 31 transmits a second RRC connection reconfiguration complete message 120 to the femtocell 13 according to the second RRC connection reconfiguration message 118. The femtocell 13 transmits a second RAB setup response message 122 to the femtocell gateway 15b according to the second RRC connection reconfiguration complete message 120. Then, the femtocell gateway 15b relays the second RAB setup response message 122 to the MME 15a. The MME 15a transmits a create bearer response message 124 to the S-GW 15c according to the second RAB setup response message 122. Finally, the S-GW 15c relays the create bearer response message 124 to the P-GW 15d to inform of the information of the S5 bearer.

So far, the Evolved Packet Core (EPC) bearer between the P-GW 15d and the femtocell 13 and the radio bearer between the femtocell 13 and the UE 31 have been established through the preliminary network connection setup procedure shown in FIG. 3, so the UE 31 can perform a voice data transmission with the core network 15 via the first wireless connection 101, the second wireless connection 109 and the third wired connection 107 to prevent the voice data transmission from being influenced by the ISP network 21.

Figure 4:
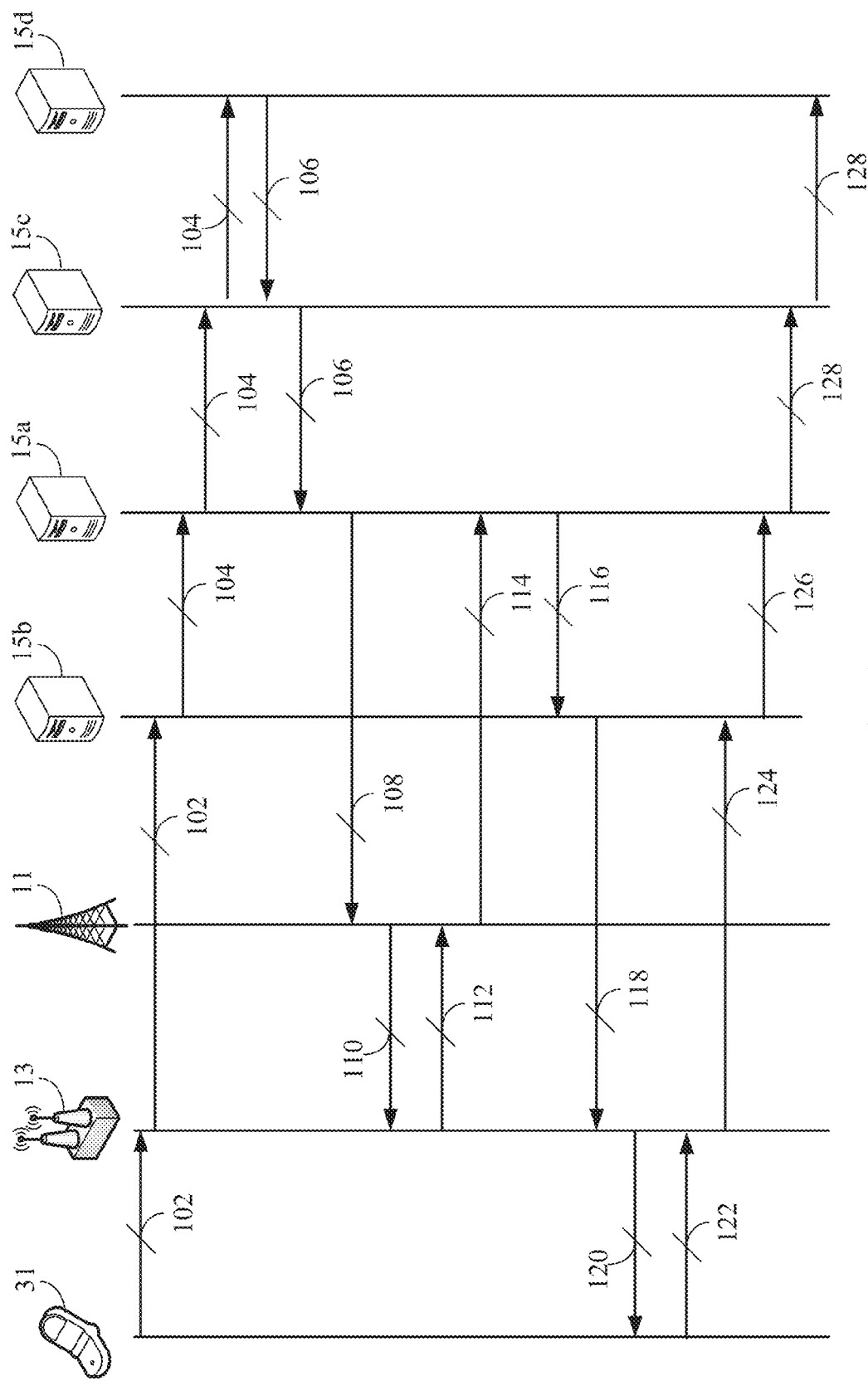
FIG. 4 is a preliminary network connection setup procedure according to the fourth embodiment of the present invention.

The fourth embodiment is as shown in FIG. 2 and FIG. 4. FIG. 4 depicts a preliminary network connection setup procedure when a user requests a voice service. The fourth embodiment differs from the third embodiment in that the UE 31 further transmits an NAS control message 102 to the femtocell gateway 15b via the first wireless connection 101, the first wired connection 103 and the second wired connection 105 in the fourth embodiment.

After receiving the NAS control message 102 from the UE 31 via the first wireless connection 101, the first wired connection 103 and the second wired connection 105, the femtocell gateway 15b relays the NAS control message 102 to the MME 15a. The NAS control message 102 comprises the bearer resource allocation request information and QoS information. The MME 15a transmits a bearer resource command message 104 to the S-GW 15c according to the NAS control message 102. The S-GW 15c relays the bearer resource command message 104 to the P-GW 15d. Then, the P-GW 15d generates a bearer setup request message 106 according to the bearer resource command message 104. It shall be appreciated that subsequent operations of the fourth embodiment is just the same as those of the third embodiment and, thus, will not be further described herein.

Figure 5:
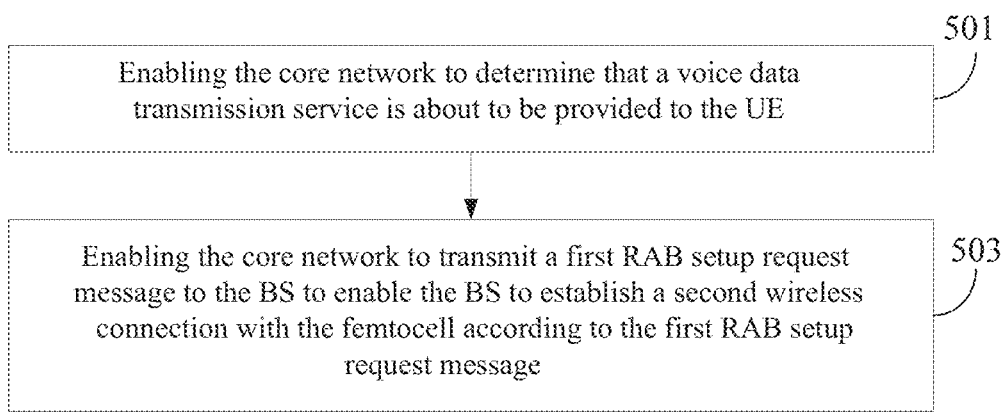
FIG. 5 is a flowchart diagram of a communication method according to the fifth embodiment of the present invention.

The fifth embodiment of the present invention is shown in FIG. 5, which is a flowchart diagram of a communication method for a communication system. The communication method is suitable for use in the communication system 1 of the first embodiment. The communication system comprises a femtocell, a BS and a core network. The BS has a signal coverage. The femtocell is deployed within the signal coverage of the BS, and establishes a first wireless connection with a UE and a first wired connection with an ISP network. The core network establishes a second wired connection with the ISP network, and establishes a third wired connection with the BS.

First, step 501 is executed to enable the core network to determine that a voice data transmission service is about to be provided to the UE. Then, step 503 is executed to enable the core network to transmit a first radio access bearer (RAB) setup request message to the BS to enable the BS to establish a second wireless connection with the femtocell according to the first RAB setup request message. Thereby, the UE can perform a voice data transmission with the core network via the first wireless connection, the second wireless connection and the third wired connection.

In addition to the aforesaid steps, the fifth embodiment can also execute all the operations and functions set forth in the first embodiment. The method in which the fifth embodiment executes these operations and functions will be readily appreciated by those of ordinary skill in the art based on the explanation of the first embodiment, and thus, will not be further described herein.

Figure 6:
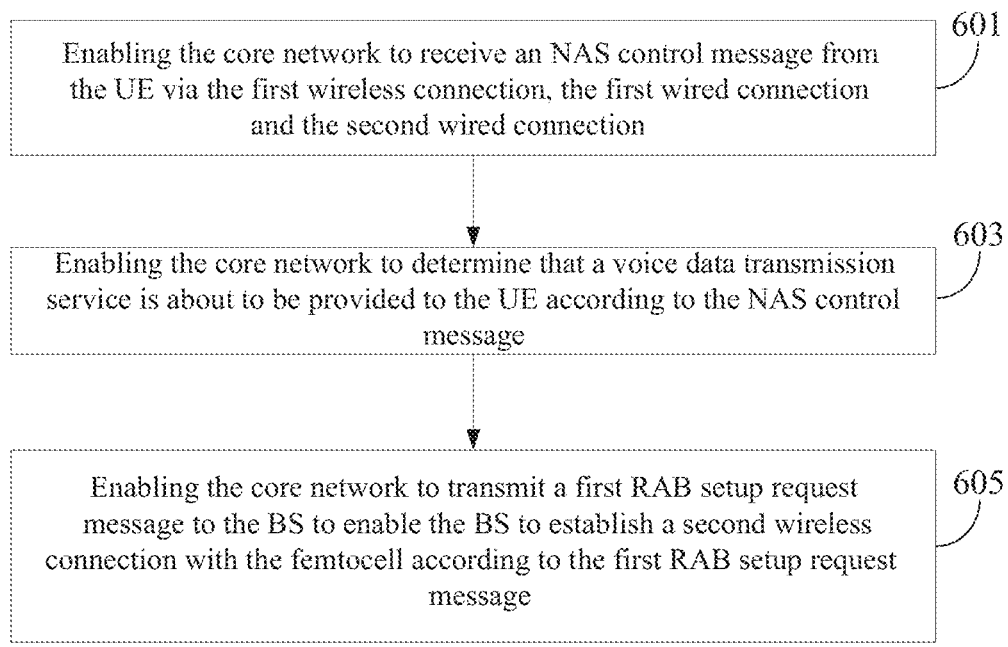
FIG. 6 is a flowchart diagram of a communication method according to the sixth embodiment of the present invention.

The sixth embodiment of the present invention is shown in FIG. 6, which is a flowchart diagram of a communication method for a communication system. The communication method is suitable for use in the communication system 1 of the second embodiment. The communication system comprises a femtocell, a BS and a core network. The BS has a signal coverage. The femtocell is deployed within the signal coverage of the BS, and establishes a first wireless connection with a UE and a first wired connection with an ISP network. The core network establishes a second wired connection with the ISP network, and establishes a third wired connection with the BS.

First, step 601 is executed to enable the core network to receive an NAS control message from the UE via the first wireless connection, the first wired connection and the second wired connection. Then, step 603 is executed to enable the core network to determine that a voice data transmission service is about to be provided to the UE according to the NAS control message. Finally, step 605 is executed to enable the core network to transmit a first RAB setup request message to the BS to enable the BS to establish a second wireless connection with the femtocell according to the first RAB setup request message. Thereby, the UE can perform a voice data transmission with the core network via the first wireless connection, the second wireless connection and the third wired connection.

In addition to the aforesaid steps, the sixth embodiment can also execute all the operations and functions set forth in the second embodiment. The method in which the sixth embodiment executes these operations and functions will be readily appreciated by those of ordinary skill in the art based on the explanation of the second embodiment, and thus, will not be further described herein.

Figure 7A:
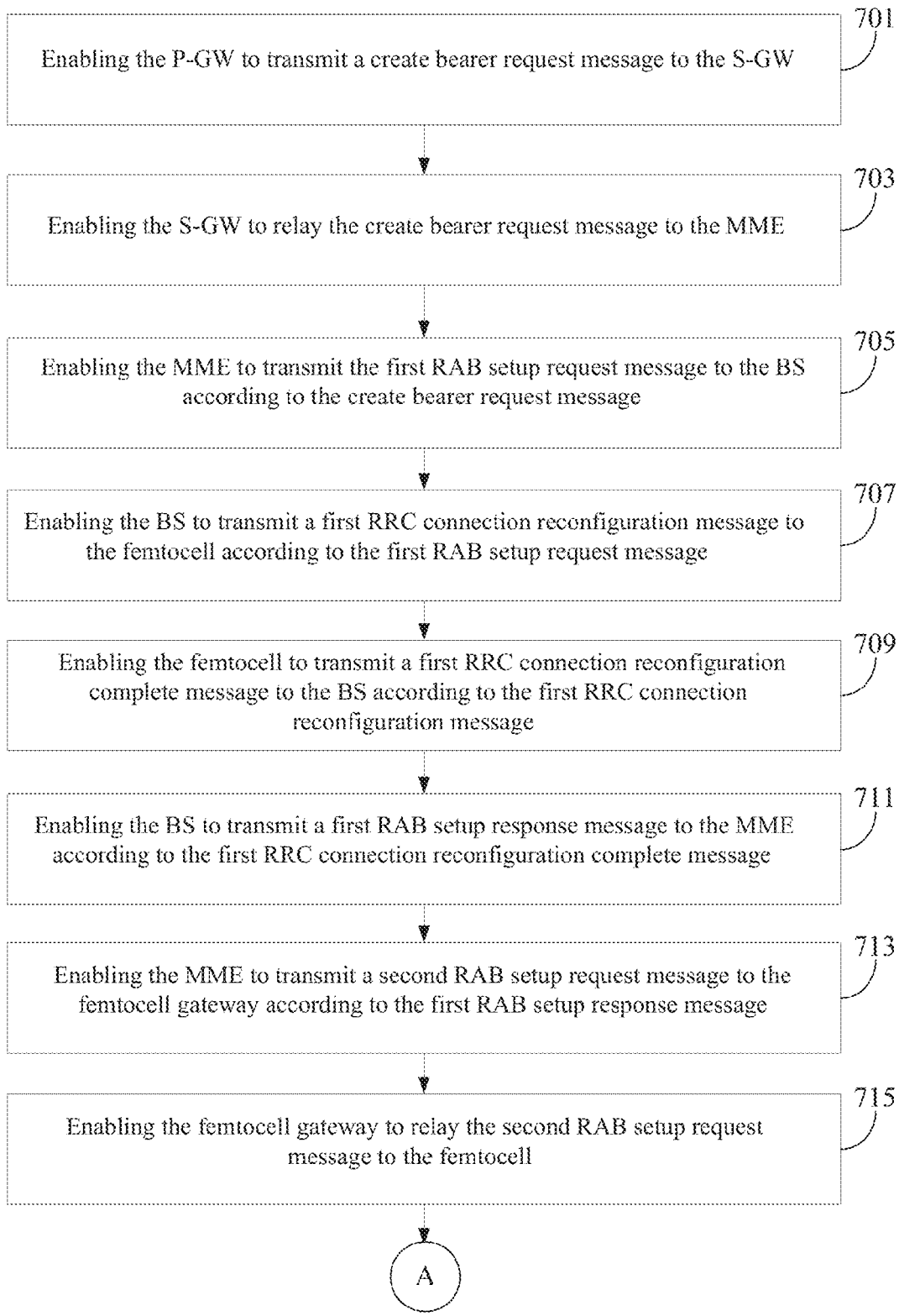
FIGS. 7A-7B are flowchart diagrams of a communication method according to the seventh embodiment of the present invention.
Figure 7B:
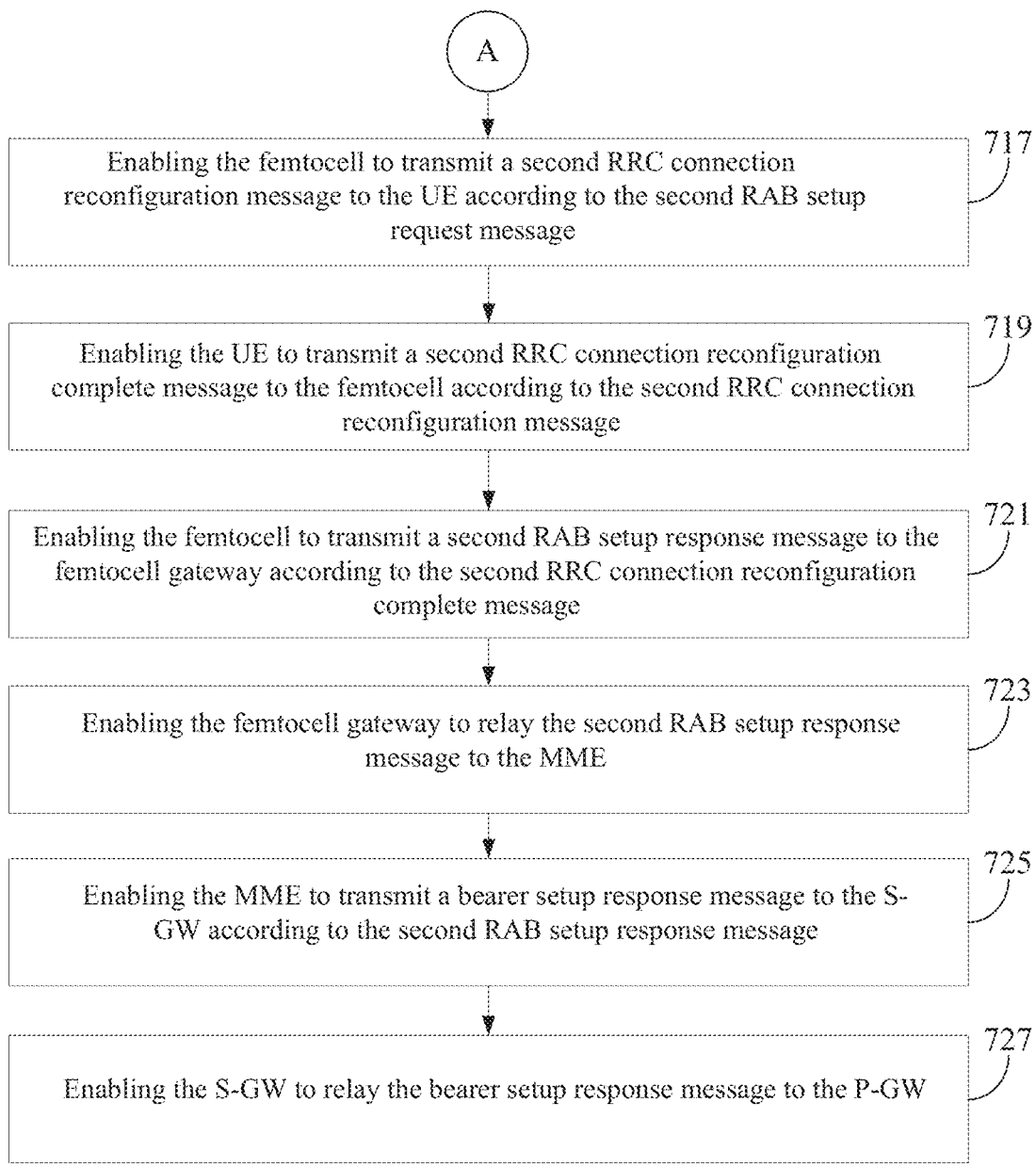

The seventh embodiment of the present invention is shown in FIGS. 7A-7B, which are flowchart diagrams of a communication method for a communication system. The communication method is suitable for use in the communication system 1 of the third embodiment. The communication system comprises a femtocell, a BS and a core network. The BS has a signal coverage. The femtocell is deployed within the signal coverage of the BS, and establishes a first wireless connection with a UE and a first wired connection with an ISP network. The core network establishes a second wired connection with the ISP network, and establishes a third wired connection with the BS. The core network comprises a femtocell gateway and an MME, a serving gateway (S-GW) and a packet data gateway (P-GW). The femtocell gateway establishes the second wired connection with the ISP network, and the MME establishes the third wired connection with the BS.

First, step 701 is executed to enable the P-GW to transmit a create bearer request message to the S-GW. Step 703 is executed to enable the S-GW to relay the create bearer request message to the MME. Step 705 is executed to enable the MME to transmit the first RAB setup request message to the BS according to the create bearer request message. The create bearer request message comprises an identification and QoS information of the UE. Specifically, step 705 is to enable the MME to determine that the voice data transmission service is about to be provided to the UE according to the identification and the QoS information of the UE so as to transmit the first RAB setup request message to the BS. Then, step 707 is executed to enable the BS to transmit a first radio resource control (RRC) connection reconfiguration message to the femtocell according to the first RAB setup request message.

Next, step 709 is executed to enable the femtocell to transmit a first RRC connection reconfiguration complete message to the BS according to the first RRC connection reconfiguration message. Step 711 is executed to enable the BS to transmit a first RAB setup response message to the MME according to the first RRC connection reconfiguration complete message. Step 713 is executed to enable the MME to transmit a second RAB setup request message to the femtocell gateway according to the first RAB setup response message.

Afterwards, step 715 is executed to enable the femtocell gateway to relay the second RAB setup request message to the femtocell. Step 717 is executed to enable the femtocell to transmit a second RRC connection reconfiguration message to the UE according to the second RAB setup request message. Thereafter, step 719 is executed to enable the UE to transmit a second RRC connection reconfiguration complete message to the femtocell according to the second RRC connection reconfiguration message. Step 721 is executed to enable the femtocell to transmit a second RAB setup response message to the femtocell gateway according to the second RRC connection reconfiguration complete message.

Subsequently, step 723 is executed to enable the femtocell gateway to relay the second RAB setup response message to the MME. Step 725 is executed to enable the MME to transmit a bearer setup response message to the S-GW according to the second RAB setup response message. Finally, step 727 is executed to enable the S-GW to relay the bearer setup response message to the P-GW.

Through the aforesaid steps, the UE can perform the voice data transmission with the core network via the first wireless connection, the second wireless connection and the third wired connection to prevent the voice data transmission from being influenced by the ISP network. In addition to the aforesaid steps, the seventh embodiment can also execute all the operations and functions set forth in the third embodiment. The method in which the seventh embodiment executes these operations and functions will be readily appreciated by those of ordinary skill in the art based on the explanation of the third embodiment, and thus will not be further described herein.

Figure 8A:
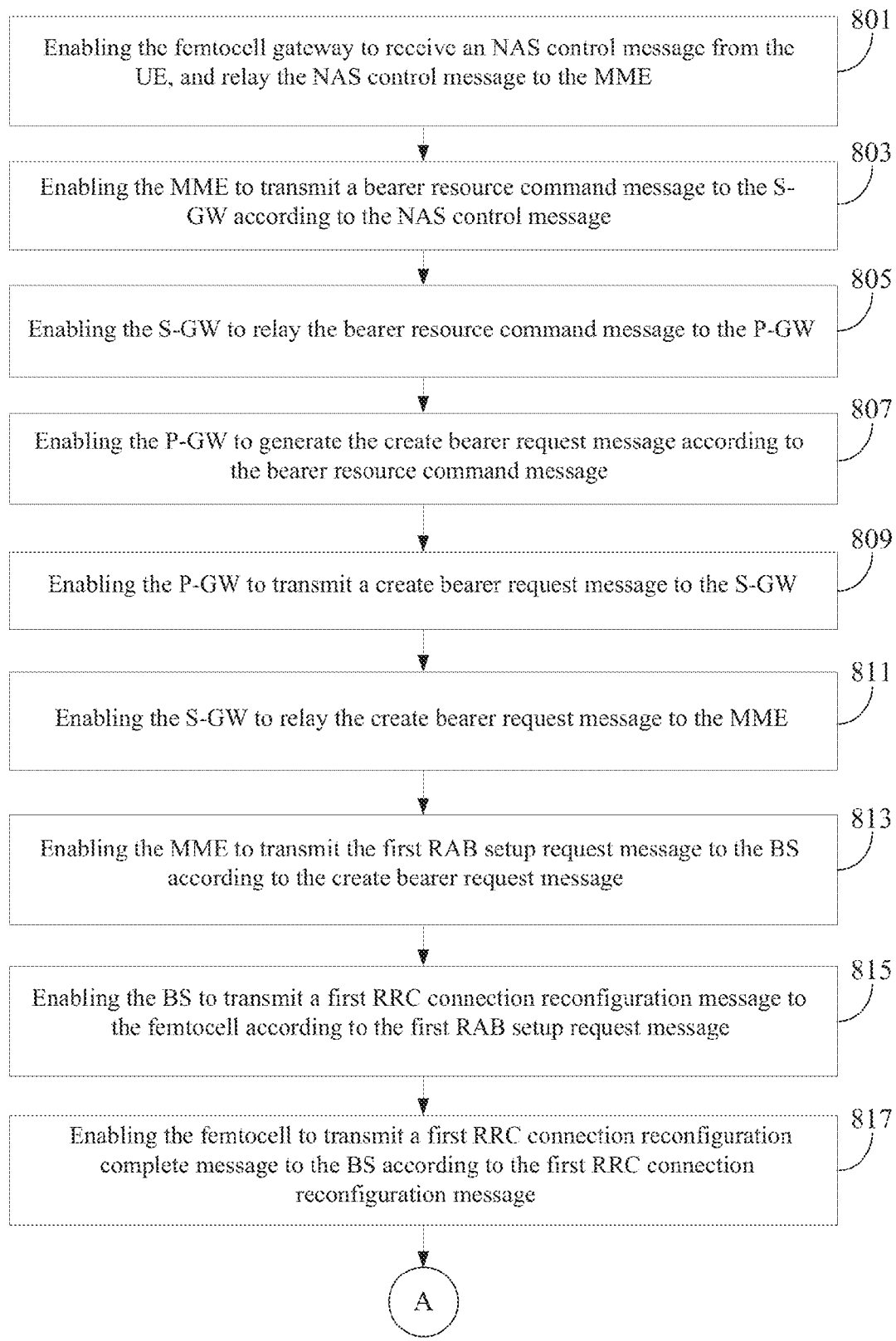
FIGS. 8A-8B are flowchart diagrams of a communication method according to the eighth embodiment of the present invention.
Figure 8B:
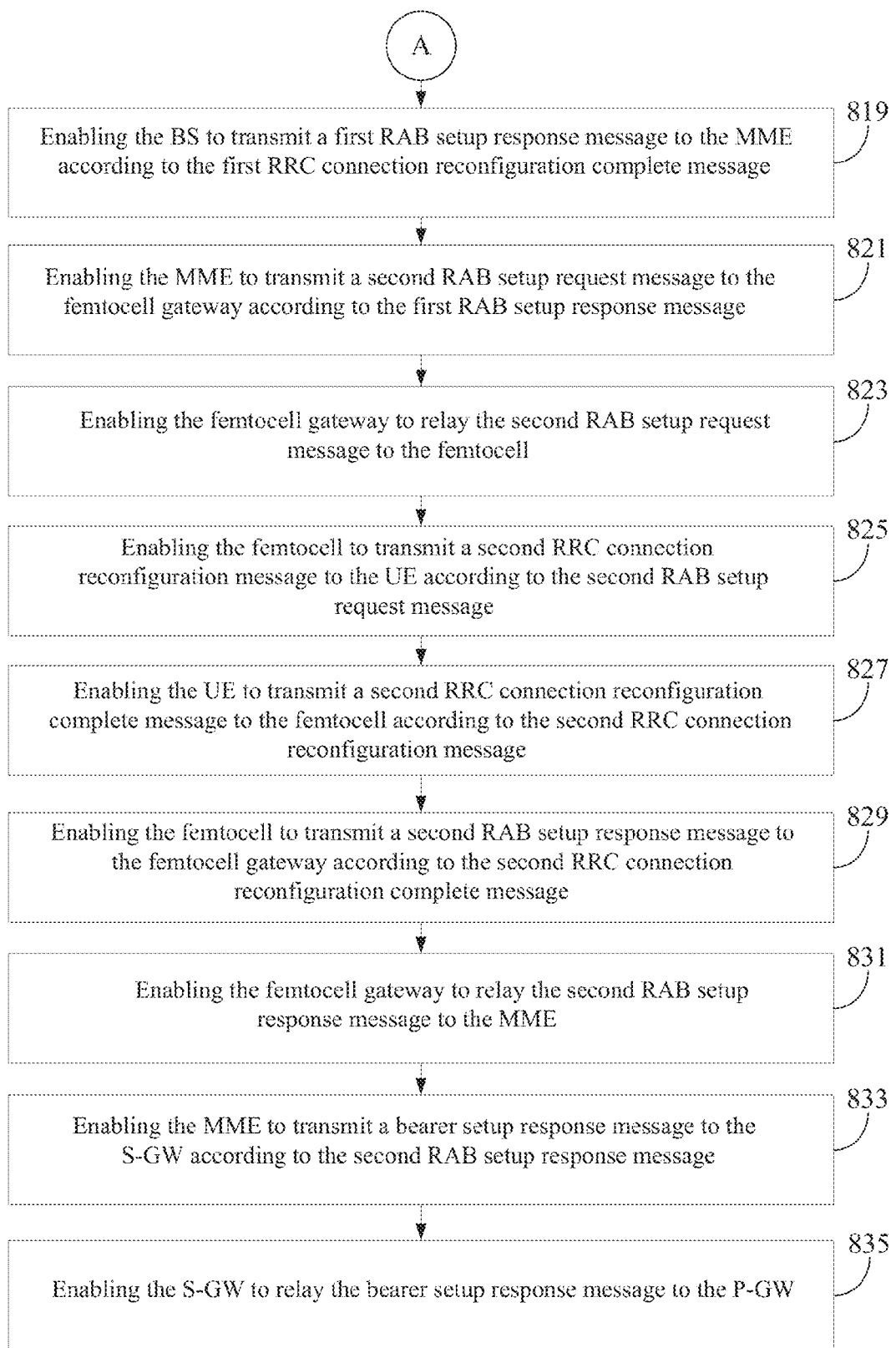

The eighth embodiment of the present invention is shown in FIGS. 8A-8B, which are flowchart diagrams of a communication method for a communication system. The communication method is suitable for use in the communication system 1 of the fourth embodiment. The communication system comprises a femtocell, a BS and a core network. The BS has a signal coverage. The femtocell is deployed within the signal coverage of the BS, and establishes a first wireless connection with a UE and a first wired connection with an ISP network. The core network establishes a second wired connection with the ISP network, and establishes a third wired connection with the BS. The core network comprises a femtocell gateway, an MME, a serving gateway (S-GW) and a packet data gateway (P-GW). The femtocell gateway establishes the second wired connection with the ISP network, and the MME establishes the third wired connection with the BS.

First, step 801 is executed to enable the femtocell gateway to receive an NAS control message from the UE via the first wireless connection, the first wired connection and the second wired connection, and relay the NAS control message to the MME. The NAS control message includes QoS information.

Step 803 is executed to enable the MME to transmit a bearer resource command message to the S-GW according to the NAS control message, and step 805 is executed to enable the S-GW to relay the bearer resource command message to the P-GW. Then, step 807 is executed to enable the P-GW to generate the create bearer request message according to the bearer resource command message.

Next, step 809 is executed to enable the P-GW to transmit a create bearer request message to the S-GW, and step 811 is executed to enable the S-GW to relay the create bearer request message to the MME. Step 813 is executed to enable the MME to transmit the first RAB setup request message to the BS according to the create bearer request message. Specifically, the create bearer request message comprises an identification and QoS information of the UE, and the step 813 is to enable the MME to determine that the voice data transmission service is about to be provided to the UE according to the identification and the QoS information of the UE to transmit the first RAB setup request message to the BS. Then, step 815 is executed to enable the BS to transmit a first radio resource control (RRC) connection reconfiguration message to the femtocell according to the first RAB setup request message.

Next, step 817 is executed to enable the femtocell to transmit a first RRC connection reconfiguration complete message to the BS according to the first RRC connection reconfiguration message. Step 819 is executed to enable the BS to transmit a first RAB setup response message to the MME according to the first RRC connection reconfiguration complete message. Step 821 is executed to enable the MME to transmit a second RAB setup request message to the femtocell gateway according to the first RAB setup response message.

Afterwards, step 823 is executed to enable the femtocell gateway to relay the second RAB setup request message to the femtocell. Step 825 is executed to enable the femtocell to transmit a second RRC connection reconfiguration message to the UE according to the second RAB setup request message. Thereafter, step 827 is executed to enable the UE to transmit a second RRC connection reconfiguration complete message to the femtocell according to the second RRC connection reconfiguration message. Step 829 is executed to enable the femtocell to transmit a second RAB setup response message to the femtocell gateway according to the second RRC connection reconfiguration complete message.

Subsequently, step 831 is executed to enable the femtocell gateway to relay the second RAB setup response message to the MME. Step 833 is executed to enable the MME to transmit a bearer setup response message to the S-GW according to the second RAB setup response message. Finally, step 835 is executed to enable the S-GW to relay the bearer setup response message to the P-GW.

Through the aforesaid steps, the UE can perform the voice data transmission with the core network via the first wireless connection, the second wireless connection and the third wired connection to prevent the voice data transmission from being influenced by the ISP network. In addition to the aforesaid steps, the eighth embodiment can also execute all the operations and functions set forth in the fourth embodiment. The method in which the eighth embodiment executes these operations and functions will be readily appreciated by those of ordinary skill in the art based on the explanation of the fourth embodiment, and thus, will not be further described herein.

According to the above descriptions, the communication system of the present invention comprises a BS, a femtocell and a core network. The femtocell is deployed within a signal coverage of the BS. When the core network determines that a voice data transmission service is about to be provided to a UE, the core network enables the BS to establish a wireless connection with the femtocell so as to perform a voice data transmission with the UE via the wireless connection. Thereby, when the UE performs the voice data transmission with the core network via the femtocell, the voice data transmission between the femtocell and the core network is accomplished through the BS instead of the ISP network. Thus, the influence of the network quality of the ISP network on the QoS of the voice data transmission is prevented.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication system, comprising:
   a base station (BS), having a signal coverage;
   a femtocell, being deployed within the signal coverage, establishing a first wired connection with an internet service provider (ISP) network, and establishing a first wireless connection with a user equipment (UE); and
   a core network, establishing a second wired connection with the ISP network, establishing a third wired connection with the BS, and being configured to determine that a voice data transmission service is about to be provided to the UE, and transmit a first radio access bearer (RAB) setup request message to the BS when the voice data transmission service is about to be provided to the UE to enable the BS to establish a second wireless connection with the femtocell according to the first RAB setup request message so that the UE performs a voice data transmission with the core network over the BS and the femtocell via the first wireless connection, the second wireless connection and the third wired connection;
   wherein the core network further performs a non-voice data transmission with the UE over the ISP network and the femtocell via the first wireless connection, the first wired connection and the second wired connection.

2. The communication system as claimed in claim 1, wherein the core network further receives a non access stratum (NAS) control message from the UE via the first wireless connection, the first wired connection and the second wired connection, and the core network determines that the voice data transmission service is about to be provided to the UE according to the NAS control message.

3. The communication system as claimed in claim 1, wherein the core network comprises a femtocell gateway and a mobility management entity (MME), the femtocell gateway establishes the second wired connection with the ISP network, and the MME establishes the third wired connection with the BS.

4. The communication system as claimed in claim 3, wherein the core network further comprises a serving gateway (S-GW) and a packet data gateway (P-GW), wherein:
   the P-GW transmits a create bearer request message to the S-GW;
   the S-GW relays the create bearer request message to the MME;
   the MME transmits the first RAB setup request message to the BS according to the create bearer request message;
   the BS transmits a first radio resource control (RRC) connection reconfiguration message to the femtocell according to the first RAB setup request message;
   the femtocell transmits a first RRC connection reconfiguration complete message to the BS according to the first RRC connection reconfiguration message;
   the BS transmits a first RAB setup response message to the MME according to the first RRC connection reconfiguration complete message;
   the MME transmits a second RAB setup request message to the femtocell gateway according to the first RAB setup response message;
   the femtocell gateway relays the second RAB setup request message to the femtocell;
   the femtocell transmits a second RRC connection reconfiguration message to the UE according to the second RAB setup request message;
   the UE transmits a second RRC connection reconfiguration complete message to the femtocell according to the second RRC connection reconfiguration message;
   the femtocell transmits a second RAB setup response message to the femtocell gateway according to the second RRC connection reconfiguration complete message;
   the femtocell gateway relays the second RAB setup response message to the MME;
   the MME transmits a create bearer response message to the S-GW according to the second RAB setup response message; and
   the S-GW relays the create bearer response message to the P-GW.

5. The communication system as claimed in claim 4, wherein the create bearer request message comprises an identification and a piece of quality of service (QoS) information of the UE, the MME determines that the voice data transmission service is about to be provided to the UE according to the identification and the QoS information of the UE.

6. The communication system as claimed in claim 5, wherein the femtocell gateway further receives an NAS control message from the UE via the first wireless connection, the first wired connection and the second wired connection and relays the NAS control message to the MME, and the NAS control message includes the QoS information.

7. The communication system as claimed in claim 6, wherein the MME transmits a bearer resource command message to the S-GW according to the NAS control message, the S-GW relays the bearer resource command message to the P-GW, and the P-GW generates the create bearer request message according to the bearer resource command message.

8. The communication system as claimed in the claim 1, wherein the femtocell has a first antenna module and a second antenna module, the first antenna module is configured to establish the first wireless connection with the UE, and the second antenna module is configured to establish the second wireless connection with the BS.

9. A communication method for use in a communication system, the communication system comprising a femtocell, a base station (BS) and a core network, the BS having a signal coverage, the femtocell being deployed within the signal coverage, establishing a first wired connection with an internet service provider (ISP) network, and establishing a first wireless connection with a user equipment (UE), and the core network establishing a second wired connection with the ISP network and establishing a third wired connection with the BS, the communication method comprising the following steps:
   enabling the core network to determine that a voice data transmission service is about to be provided to the UE;
   enabling the core network to transmit a first radio access bearer (RAB) setup request message to the BS when the voice data transmission service is about to be provided to the UE to enable the BS to establish a second wireless connection with the femtocell according to the first RAB setup request message so that the UE performs a voice data transmission with the core network over the BS and the femtocell via the first wireless connection, the second wireless connection and the third wired connection; and enabling the core network to perform a non-voice data transmission with the UE over the ISP network and the femtocell via the first wireless connection, the first wired connection and the second wired connection.

10. The communication method as claimed in claim 9, further comprising the following steps:

enabling the core network to receive a non access stratum (NAS) control message from the UE via the first wireless connection, the first wired connection and the second wired connection so as to determine that the voice data transmission service is about to be provided to the UE according to the NAS control message.

11. The communication method as claimed in claim 9, wherein the core network comprises a femtocell gateway and a mobility management entity (MME), the femtocell gateway establishes the second wired connection with the ISP network, and the MME establishes the third wired connection with the BS.

12. The communication method as claimed in claim 11, wherein the core network further comprises a serving gateway (S-GW) and a packet data gateway (P-GW), the communication method further comprising the following steps:

enabling the P-GW to transmit a create bearer request message to the S-GW;

enabling the S-GW to relay the create bearer request message to the MME;

enabling the MME to transmit the first RAB setup request message to the BS according to the create bearer request message;

enabling the BS to transmit a first radio resource control (RRC) connection reconfiguration message to the femtocell according to the first RAB setup request message;

enabling the femtocell to transmit a first RRC connection reconfiguration complete message to the BS according to the first RRC connection reconfiguration message;

enabling the BS to transmit a first RAB setup response message to the MME according to the first RRC connection reconfiguration complete message;

enabling the MME to transmit a second RAB setup request message to the femtocell gateway according to the first RAB setup response message;

enabling the femtocell gateway to relay the second RAB setup request message to the femtocell;

enabling the femtocell to transmit a second RRC connection reconfiguration message to the UE according to the second RAB setup request message;

enabling the UE to transmit a second RRC connection reconfiguration complete message to the femtocell according to the second RRC connection reconfiguration message;

enabling the femtocell to transmit a second RAB setup response message to the femtocell gateway according to the second RRC connection reconfiguration complete message;

enabling the femtocell gateway to relay the second RAB setup response message to the MME;

enabling the MME to transmit a bearer setup response message to the S-GW according to the second RAB setup response message; and enabling the S-GW to relay the bearer setup response message to the P-GW.

13. The communication method as claimed in claim 12, wherein the create bearer request message comprises an identification and a piece of quality of service (QoS) information of the UE, the communication method further comprising the following steps:

enabling the MME to determine that the voice data transmission service is about to be provided to the UE according to the identification and the QoS information of the UE.

14. The communication method as claimed in claim 13, further comprising the following steps:

enabling the femtocell gateway to receive an NAS control message from the UE via the first wireless connection, the first wired connection and the second wired connection, and relay the NAS control message to the MME, wherein the NAS control message includes the QoS information.

15. The communication method as claimed in claim 14, further comprising the following steps:

enabling the MME to transmit a bearer resource command message to the S-GW according to the NAS control message;

enabling the S-GW to relay the bearer resource command message to the P-GW; and enabling the P-GW to generate the create bearer request message according to the bearer resource command message.

16. The communication method as claimed in claim 9, wherein the femtocell has a first antenna module and a second antenna module, the first antenna module is configured to establish the first wireless connection with the UE, and the second antenna module is configured to establish the second wireless connection with the BS.

* * * * *